Patented June 14, 1938

2,120,743

UNITED STATES PATENT OFFICE 2,120,743

DERIVATIVES OF AZO-DYESTUFFS AND PROCESS OF MAKING SAME

Charles Graenacher and Heinrich Bruengger, Basel, Switzerland, assignors to the firm of Society of Chemical Industry in Basle, Basel, Switzerland No Drawing. Application April 1, 1937, Serial No. 134,453. In Switzerland April 9, 1936

8 Claims. (Cl. 260—81)

This invention consists in the manufacture of new valuable ester-like derivatives of azo-dyestuffs wherein an azo-dyestuff containing at least one phenolic hydroxyl group (this expression comprising also an OH-group behaving as a phenolic hydroxyl group) and in which at most one such group is contained in the adjacent position to the azo-group, is treated by a method which will convert such hydroxyl group or groups into acid esters of sulfuric acid.

The esterification may consist in treating the parent dyestuff with chlorosulfonic acid or a derivative thereof, such as an ester or amide or product of similar action like sulfur trioxide, in presence of a tertiary base. It is best to work with pyridine sulfotrioxide in pyridine solution. As is known, pyridine sulfotrioxide is the product which is formed when SO₃, chlorosulfonic acid or derivatives thereof are caused to react with pyridine. When the reaction is complete the mass is advantageously mixed with non-volatile bases, such as for example alkali carbonates or caustic alkalies, and the volatile tertiary base is removed for example by distillation with steam. In this manner the primary salts of the reaction product with the volatile tertiary amine are converted into a salt of the non-volatile base, for example an alkali salt. In this manner products are obtained which are characterized by the presence of at least one —O—SO₃-cation group and which are distinguished from the parent dyestuffs by an enhanced solubility in water, and by treatment for instance with an acid saponifying agent in substance or on a substratum such as on the fiber can be reconverted into the sparingly soluble parent dyestuff. This capacity for being converted from the soluble product into the sparingly soluble dyestuff or insoluble pigment opens the door to the use of the new products for manifold purposes, for example for producing fast dyeings on textiles or for producing fast colored masses of artificial materials. The azo-dyestuffs used in the process as parent products may contain in complex union one or more metals, for instance copper, chromium, iron nickel, cobalt. These metals may even be introduced in the sulfuric acid esterification products. Alternatively the dyestuff may be converted into the complex metal compound simultaneously with or after the reconversion of the sulfuric acid ester of the dyestuff into the sparingly soluble dyestuff or insoluble pigment.

The process is applicable to azo-dyestuffs of the kind referred to above whether the dyestuff is a mono-, dis- or poly-azo-dyestuff; it is a matter of indifference in what manner the dyestuff is made.

Among the components to be diazotized for producing the dyestuffs are generally primary amines of the benzene or naphthalene series and their sulfonic acids and carboxylic acids; also primary mono-, di- and poly-amines of the diphenyl, diphenyl methane, triphenyl methane, carbazole, urea, diazine, triazine and the like series may be used. For example the various halogenated anilines, chlorotoluidines, for instance 1-amino-2-methyl-4- or 5-chlorobenzene, nitraniline and their analogues, for example the 3-nitranilines, 1-amino-2-nitro-4-methyl- or 4-chloro-benzene; ortho-amino-diphenyl ethers, for example the 4-chloraminodiphenyl ether, the 4:4′-dichloramino-diphenyl ether or the ethyl ester of 4′-chloro-2-amino-diphenyl ether-4-carboxylic acid; carboxylic acids, for instance anthranilic acid, para-amino-salicylic acid; sulfonic acids, for instance sulfanilic acid, 2-naphthylamine-1-sulfonic acid; acylated derivatives of meta- or para-phenylene diamine, for instance mono-benzoylated, mono-cinnamoylated or mono-phenoxyacetylated diamino-hydroquinone-dimethyl- or diethyl ether; diphenylamine derivatives, for instance 4′-methoxy-4-amino-diphenylamine; heterocyclic derivatives, for instance dehydrothiotoluidine; diamines, for instance benzidine and homologues or analogues thereof, such as dianisidine; urea derivatives, such as 4:4′-diamino-diphenyl urea; aminoazo-compounds, for instance aminoazobenzene, aminoazotoluene, 4:4′-diaminoazobenzene, 4:4′-diamino-2-methoxy-5-methyl-azobenzene, 4:4′-diamino-1:1′-benzene azonaphthalene.

Among the coupling components which may contain sulfonic acid and carboxylic acid groups there may be named those of the benzene series, such as phenol, cresols, for instance para-cresol and its substitution products, α-naphthol, arylides of phenol carboxylic acids, for instance the arylides of para-cresotinic acid and sulfonic acids of such compounds. Heterocyclic coupling components also come into question, for instance 8-hydroxyquinoline, hydroxy-carbazoles, barbituric acids and the like.

Among the dyestuffs which are of particular value for treatment by the invention are those which are obtained from diazo-compounds and coupling components which couple in a position adjacent to the hydroxyl group, as is the case for example with para-cresol and its analogues, such as the arylides of para-cresotinic acid.

The dyestuff derivatives thus obtained correspond therefore to the general formula $R_1—N=N—R_2—O—SO_3$-cation in which $R_1$ stands for an aromatic radical which carries no OH-group in ortho-position to the —N=N-group, and $R_2$ stands for a cyclic radical which corresponds to a cyclic compound carrying a phenolic hydroxyl group. These products are yellow to brown powders dissolving in water with formation of solutions which on addition of acid precipitate the parent product of the general formula $R_1—N=N—R_2—OH$, wherein $R_1$ and $R_2$ have the signification indicated above. Special reference is made to those products in which $R_1$ and $R_2$ stand for aromatic radicals of the benzene series and in which the —O—$SO_3$H-group stands in ortho-position to the —N=N-group.

The following examples illustrate the invention, the parts being by weight:—

Example 1

Into 150 parts of dry pyridine are introduced cautiously while stirring and cooling with ice and salt 10 parts of chlorosulfonic acid and then the temperature of the mixture is allowed to rise to about 20° C. There are then added 6.8 parts of the pigment from diazotized 4-amino-3,2'-dimethyl-azobenzene and para-cresol and the whole is gradually heated to 60 to 70° C. and kept at this temperature for 3 to 4 hours, whereby the pigment becomes gradually dissolved and a clear intensive yellow-brown solution is produced. The latter is allowed to cool and poured into a solution of 55 parts of anhydrous sodium carbonate or 83 parts of potassium carbonate in 220 parts of water. By distillation with steam the pyridine is then expelled, the aqueous residue of the distillation is cooled and the separated solid product of the reaction is filtered. For the purpose of separating any unaltered parent pigment the salt of the sulfuric acid ester thus obtained is dissolved in water and the solution is filtered and the ester salted out from the hot solution and filtered. The new sulfo-ester is thus obtained in the form of a fine crystalline orange product of the probable formula

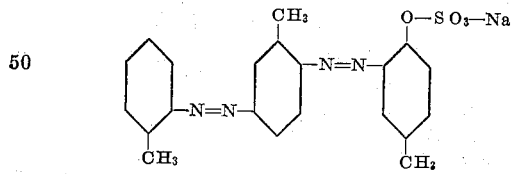

which dissolves in water to an orange-red solution and on addition of acid is easily reconverted into the parent pigment.

When the azo-dyestuff from diazotized 4-amino-3,2'-dimethyl azobenzene and the ortho-anisidide of para-hydroxybenzoic acid is used there is obtained a product of the probable formula

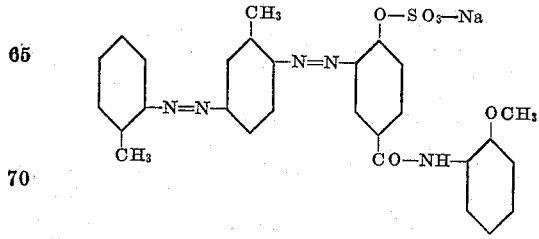

which dissolves in water to a yellow-brown solution. By adding acid to the aqueous solution of this compound the latter is decomposed with regeneration of the sparingly soluble brown parent dyestuff.

Example 2

Into a mixture made as described in Example 1 from 30 parts of pyridine and 3.4 parts of chlorosulfonic acid there are introduced 1.8 parts of the product of coupling diazotized dehydro-thiotoluidine with para-cresol and the whole is heated for 3 to 4 hours at 60 to 70° C., whereby the parent pigment is gradually dissolved. The mixture is poured into a solution of 20 parts of anhydrous sodium carbonate in 80 parts of water and the pyridine is then distilled with steam. The aqueous residue is cooled and the precipitated product of the reaction is filtered. The sulfuric acid ester thus obtained of the probable formula

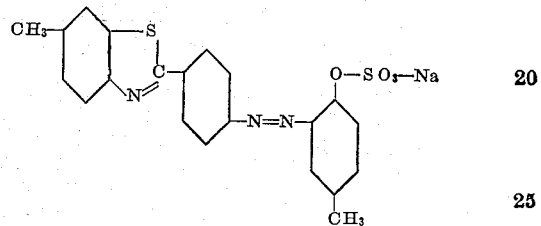

dissolves in hot water to a yellow solution and on addition of dilute acid the insoluble pigment is precipitated from the solution.

The yellow to orange and brown dyestuffs obtainable from other heterocyclic diazotizable components, for instance 4-amino-N-phenyl-azimidobenzene, and coupling components, for instance para-cresol, or from simple diazotizable components, for instance aniline, 2,5-dichloraniline, 2-methoxy-5-methyl-1-aminobenzene, 4-methoxyl-1-aminobenzene, 4-chloro-2-amino-1,1-diphenyl ether, and coupling components, for instance para-cresol, 4-chloro-3-methyl-1-hydroxybenzene, the anilide of para-cresotinic acid, α-naphthol, 8-hydroxyquinoline, may similarly be converted into the products soluble in water from which the insoluble parent dyestuff may be regenerated by addition of acid.

Example 3

Into a mixture prepared as described in Example 1 from 100 parts of pyridine and 14.4 parts of chlorosulfonic acid there are introduced at 20° C. 10 parts of the coupling product from tetrazotized 4,4'-diamino-2-methyl-5-methoxy-azobenzene and para-cresol, whereupon the whole is gradually heated to 60 to 70° C. and kept at this temperature for 3 to 4 hours. The mass is then allowed to cool, whereby the greater part of the product separates in a crystalline form and a viscid paste is produced. This crystalline magma is poured into a solution of 75 parts of anhydrous sodium carbonate in 300 parts of water and the pyridine is expelled with steam. When the residue from the distillation is cooled it is filtered with suction. The brown product of the probable formula

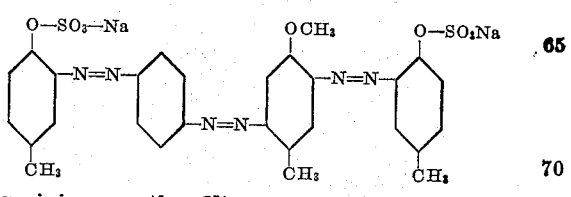

remaining on the filter dissolves in hot water to a brown solution. By recrystallization and by salting out from a hot aqueous solution it may be purified.

Example 4

Into a mixture prepared as described in Example 1 from 30 parts of pyridine and 3.4 parts of chlorosulfonic acid there are introduced 1.1 parts of the product of coupling the diazotized azo-dyestuff from 4-chloro-diazobenzene and 1 - amino - 2 - methoxy - naphthalene with 1-hydroxy-4-chloro-3-methylbenzene and the mixture is heated gradually to 60 to 70° C. and kept at that temperature for 4 hours. When the reaction is complete the whole is allowed to cool and poured into a solution of 20 parts of anhydrous sodium carbonate in 80 parts of water, whereupon the product is worked up in the manner previously described. The new product of the formula

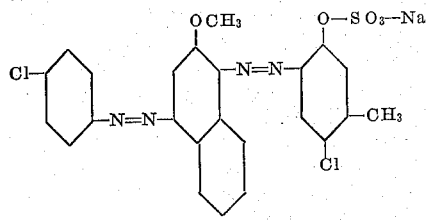

forms a brown powder which dissolves in hot water to a brown solution and is reconverted into the parent pigment by means of dilute acid.

In similar manner the coupling product from diazotized 4-amino-3-methoxy-azobenzene and para-cresol is converted into the water-soluble compound from the aqueous solution of which the insoluble pigment may be recovered by addition of dilute acid.

Example 5

To the product of reaction of 5.8 parts of chlorosulfonic acid ethyl ester with 40 parts of pyridine there are added 3.4 parts of the coupling product from diazotized 4 - amino - 3 - methoxy-azobenzene and para-cresol and the mixture is gradually heated to 60 to 70° C. After the reaction has continued for 4 hours the product is soluble in water. The mixture is cooled, poured into a solution of 15 parts of anhydrous sodium carbonate and 5 parts of caustic soda solution of 35 per cent. strength in 80 parts of water. The pyridine is distilled with steam and after cooling the product which has separated is filtered with suction. By resolution and precipitation by means of sodium chloride from a weak alkaline solution the product of the probable formula

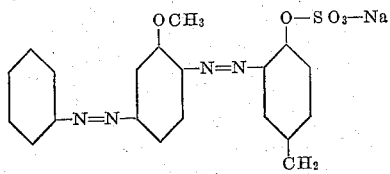

may be purified.

This substance dissolves in water to a brown solution and is easily reconverted into the parent pigment by means of dilute acid.

Example 6

To the product of reaction of 11 parts of pyrosulfuryl chloride with 50 parts of pyridine there are added 5.1 parts of the coupling product from diazotized 2-methoxy-5-methyl-1-aminobenzene and para-cresol and the mixture is gradually heated to 60 to 70° C. After about 4 hours the whole has become soluble in water and when cooled is poured into a solution of 30 parts of anhydrous sodium carbonate in 120 parts of water and the pyridine is distilled with steam. The residue from the distillation is cooled and the product of reaction of the probable formula

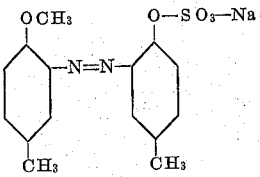

which has separated is filtered with suction. The sulfuric acid ester is an orange colored crystallized powder which dissolves in water to an orange-red solution and on addition of dilute acids regenerates the parent pigment. By recrystallization from water the product may be obtained in a pure form.

Example 7

4 parts of finely powdered aminosulfonic acid are stirred with 30 parts of pyridine and 3.4 parts of the coupling product from diazotized 4-amino-3,2'-dimethyl - azobenzene and para-cresol are added. The whole is heated for about 4 hours to 60 to 70° C. After cooling the mixture is poured into a solution of 20 parts of anhydrous sodium carbonate in 80 parts of water. The pyridine is distilled with steam and after cooling the residue of the distillation the product which has separated is filtered with suction and purified by recrystallization from water. It is identical with the product obtained according to Example 1 by esterifying with chlorosulfonic acid in pyridine.

Example 8

A printing paste consisting of

|  | Grams |
|---|---|
| Product of Example 1 | 25 |
| Water | 475 |
| Resorcinol | 30 |
| Triethanolamine | 20 |
| Neutral starch tragacanth thickening | 450 |
|  | 1000 | is printed on cotton and the goods are dried and heated in the Matherplatt apparatus for 3 to 5 minutes. The dyestuff is fixed by the passage of the print through acid, which may consist in treating the print for 30 seconds in a bath at 80° C. containing 35 cc. of sulfuric acid per liter. After rinsing the goods are soaped at the boil for a quarter of an hour. There is obtained an intense light brown print.

Example 9

A printing paste consisting of

|  | Grams |
|---|---|
| Product of Example 3 | 20 |
| Water | 480 |
| Resorcinol | 50 |
| Neutral starch tragacanth thickening | 450 |
|  | 1000 | is printed on cotton and the goods are dried at a raised temperature and then passed through acid in the manner described in Example 8. After rinsing and soaping at the boil there is produced an intense chestnut brown print. If before the passage through acid the print is heated in the Matherplatt apparatus for 3 to 5 minutes a considerably more deeply colored print is produced.

Example 10

A dyebath is prepared from 350 parts of water, 1 part of anhydrous sodium carbonate and 0.4 part of the product of Example 3. 20 parts of cotton yarn are entered into this bath at 70° C., the temperature of the bath is raised within a quarter of an hour to 90 to 95° C. and dyeing is continued for another hour, there being added 1 part of crystallized sodium sulfate. When the dyeing is complete the yarn is wrung out and the dyeing is fixed by treatment of the material for half a minute in an acid bath containing per liter 40 grams of sulfuric acid and at a temperature of 75 to 80° C. After rinsing and soaping at the boil the material is intensely and fast dyed.

The procedure is similar with silk, artificial silk from regenerated cellulose, wool, or mixtures of two or more of these fibers with one another, for example mixtures of artificial silk with natural silk, wool or also cotton.

What we claim is:—

1. Process for the manufacture of derivatives of azo-dyestuffs, consisting in causing pyridine-sulfotrioxide to react in the presence of pyridine with azo-dyestuffs of the general formula $$R_1—N=N—R_2—OH$$

in which $R_1$ stands for an aromatic radical which carries no OH-group in ortho-position to the —N=N-group, and $R_2$ stands for a cyclic radical which corresponds to a cyclic compound containing a phenolic hydroxyl group in which the hydroxyl group is in ortho-position to the —N=N-group.

2. Process for the manufacture of derivatives of azo-dyestuffs, consisting in causing pyridine-sulfotrioxide to react in the presence of pyridine with azo-dyestuffs of the general formula $$R_1—N=N—R_2—OH$$

in which $R_1$ stands for an aromatic radical which carries no OH-group in ortho-position to the —N=N-group, and $R_2$ stands for an aromatic radical of the benzene series in which the hydroxyl group is in ortho-position to the —N=N-group.

3. Process for the manufacture of derivatives of azo-dyestuffs, consisting in causing pyridine-sulfotrioxide to react in the presence of pyridine with azo-dyestuffs of the general formula $$R_1—N=N—R_2—OH$$

in which $R_1$ stands for an aromatic radical of the benzene series which carries no OH-group in ortho-position to the —N=N-group, and in which $R_2$ stands for an aromatic radical of the benzene series in which the hydroxyl group is in ortho-position to the —N=N-group.

4. Process for the manufacture of derivatives of azo-dyestuffs, consisting in causing pyridine-sulfotrioxide to react in the presence of pyridine with azo-dyestuffs of the general formula $$R_1—N=N—R_2—OH$$

in which $R_1$ stands for an aromatic radical of the benzene series which carries no OH-group in ortho-position to the —N=N-group and which is substituted in para-position to the —N=N-group by a further $R_3$—N=N-group, wherein $R_3$ represents an aromatic radical of the benzene series which carries no OH-group in ortho-position to the —N=N-group, and in which $R_2$ stands for an aromatic radical of the benzene series in which the hydroxyl group is in ortho-position to the —N=N-group.

5. Process for the manufacture of a derivative of an azo-dyestuff, consisting in causing pyridine-sulfotrioxide to react in the presence of pyridine with the azo-dyestuff of the formula

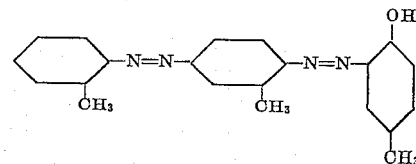

6. The compounds of the general formula $$R_1—N=N—R_2—O—SO_3\text{-cation}$$

in which $R_1$ stands for an aromatic radical which carries no OH-group in ortho-position to the —N=N-group, and $R_2$ stands for a cyclic radical which corresponds to a cyclic compound carrying a phenolic hydroxyl group and in which further the —O—SO_3—cation-group stands in ortho-position to N—R, which products are yellow to brown powders dissolving in water with formation of solutions which on addition of acid precipitate the dyestuff of the general formula $$R_1—N=N—R_2—OH$$

in which $R_1$ and $R_2$ have the signification indicated above.

7. The compounds of the general formula $$R_1—N=N—R_2—N=N—R_3—O—SO_3\text{—cation}$$

in which $R_1$, $R_2$ and $R_3$ represent aromatic nuclei of the benzene series which carry neither sulfonic-, carboxyl- nor OH-groups, in which further the —O—SO_3-cation-group stands in ortho-position to the second azo-group, which products are yellow to brown powders dissolving in water with formation of solutions which on addition of acid precipitate the dyestuff of the general formula $$R_1—N=N—R_2—N=N—R_3—OH$$

in which $R_1$, $R_2$ and $R_3$ have the signification indicated above.

8. The compound of the formula

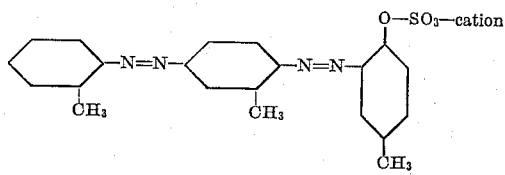

which product dissolves in water to a yellow solution and on addition of acid precipitates the insoluble azo-dyestuff of the formula

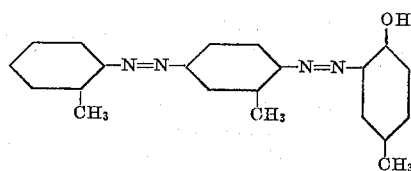

CHARLES GRAENACHER.
HEINRICH BRUENGGER.